United States Patent [19]

Southgate

[11] Patent Number: 4,657,216
[45] Date of Patent: Apr. 14, 1987

[54] WEDGE AND WEDGE ADAPTORS

[75] Inventor: Malcolm D. Southgate, Suffolk, England

[73] Assignee: W. Vinten Limited, England

[21] Appl. No.: 768,131

[22] Filed: Aug. 22, 1985

[30] Foreign Application Priority Data

Sep. 1, 1984 [GB] United Kingdom ............... 8422153

[51] Int. Cl.[4] ........................................... F16M 11/04
[52] U.S. Cl. .................................. 248/187; 248/316.4
[58] Field of Search ............ 248/187, 177, 176, 316.4; 354/293, 294

[56] References Cited

U.S. PATENT DOCUMENTS

| 2,880,490 | 4/1959 | Rizzatti et al. | 354/293 |
| 3,006,052 | 10/1961 | Stickney et al. | 248/187 |
| 3,356,325 | 12/1967 | Schnase | 248/187 |
| 3,549,113 | 12/1970 | Pagliuso | 248/187 |
| 4,398,815 | 8/1983 | Barzee et al. | 354/293 |

FOREIGN PATENT DOCUMENTS 537726 10/1955 Belgium ............... 248/187

Primary Examiner—Ramon S. Britts
Assistant Examiner—Karen J. Chotkowski
Attorney, Agent, or Firm—Larson and Taylor

[57] ABSTRACT

A wedge and wedge adaptor for fixing television camera or the like, to such as pan and tilt heads wherein the combination of wedge and wedge adaptor provides for each of location, automatic lock of wedge to adaptor, safety lock, a full unlock position and a frictional unlock position wherein the weight of the camera on the wedge maintains the frictional unlock position to retain the wedge in the adaptor and permits the operator use of both hands for removal of the camera, the frictional unlock position advancing to the full unlock position as soon as the weight on the wedge is reduced.

5 Claims, 6 Drawing Figures

WEDGE AND WEDGE ADAPTORS

This invention relates to wedges and wedge adaptors and more particularly, though not exclusively, to automatic lock wedge adaptors especially suitable for mounting cameras or the like to such as tripod heads or pan and tilt mountings.

Basic wedge adaptors are well known in the field of television camera working and are often used in other fields where a piece of equipment is required to be quickly fitted or released from a fixed position. In the latter case an adaptor with a wedge shaped slot and preferably sloping sides to the wedge edges is usually mounted on such as a wall, bulkhead or the like and the piece of equipment to be fitted has a wedge shaped plate with mating sloping edge which slots into the adaptor and is retained in place by gravity and the sloping wedge edges. Sometimes locks are fitted to retain the wedge in the adaptor but invariably gravity alone is sufficient to retain the wedge plate.

In the case of television camera mounting or the like the wedge plate is fitted to the camera and the adaptor is fitted to the head of a tripod or to a pan and tilt mounting. As, with the case of a tilt mounting, gravity alone is insufficient to maintain the wedge plate in the wedge of the adaptor a locking means is usually provided. This locking means invariably requires at least one hand for its operation which only leaves an operator one hand with which to control the camera when fitting and/or removing same. Cameras are well known for not being the easiest of equipments for controlling and/or handling with one hand.

A further well known method of similar type is that of a plate having both ends sloping which fits into a matable adaptor and is locked in position by the action of correct mating. This type of adaptor also has its drawbacks as the plate is invariably mounted beneath the camera, i.e. on its base and is not easily viewable from a normal angle when being mated and as the plate is invariably square or oblong precise mating is required and difficulty is encountered when mounting the camera.

Some wedge adaptors are available which provide a degree of locking on mating but the locking is not overly positive and the fit leaves a lot to be desired during a tilting movement, i.e. the camera is not solidly secured to the camera mount and tends to slip or wobble during normal transitions about the tilt axis. This movement is transmitted to the viewers screen where the picture appears to jump about.

As can be seen from the foregoing, though wedge adaptors and ordinary adaptors are well known, a problem exists in one shape or another with the prior art and it is the object of this invention to provide a wedge adaptor wherein these problems are removed or at least substantially eliminated.

According to the invention we provide a wedge and wedge adaptor comprising: a base plate housing spring loaded locking means retainable in an unlock position by a spring loaded actuator means having an actuator pin operable on by a pawl pivoted on said base plate and engagable under load with said spring loaded locking means to provide a frictional unlock position prior to said unlock position, wedge engagement means on said spring loaded actuator means for releasing said spring loaded locking means to its lock position on engagement of a mating wedge and a locking means on said spring loaded locking means engagable with a recess in said wedge in said lock position.

The invention will now be described, by way of example only, in conjunction with the accompanying diagrams wherein like numerals are used to indicate like elements, and in which.

Figure 1:
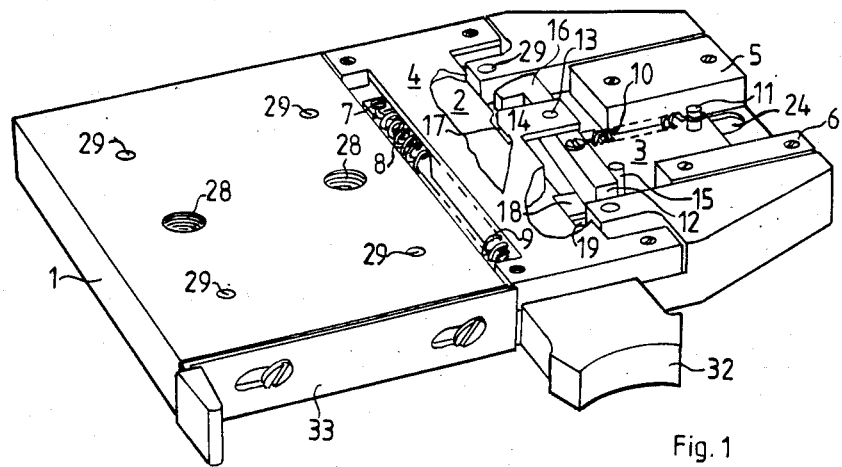
FIG. 1 shows an underside view of the wedge adaptor with cover removed

Referring now to FIG. 1 a base plate (1) has a transverse slot for reception of a locking bar (2) and a longitudinal slot for reception of an actuator (3). A bridge (4) secured to base plate (1) retains the locking bar (2) in a slidable state within the base plate (1) and actuator guides (5) and (6), suitably secured to base plate (1) provide a slidable state within the base plate (1) for the actuator (3). A tongue (7) on locking bar (2) provides one fixing position for a locking spring (8) retained at its other end on a pin (9) located in the base plate (1). The actuator (3) slidable within actuator guides (5) and (6) is under spring tension from a second spring (10) retained at one end by a stud (11) suitably located in the actuator (3) and at its other end to a pawl (12) pivoted on a pin (13) suitably located at one end in the base plate (1) and at its other end in a tongue (14) on the bridge (4). An actuator pin (15) mounted on actuator (3) is engagable with the tail of pawl (12) in a frictional unlock and full unlock state. The head (16) of pawl (12) is radiused and engages in a cut-out (17) in locking bar (2) in the frictional unlock position. To maintain a smooth frictional resistance to movement of the pawl (12) the mating edge of cut-out (17) is tangential to the radiused head. A tongue (18) on actuator (3) is engagable in a second cut-out (19) in locking bar (2) in the full unlock position. Cut-outs (17) and (19) are more clearly shown on FIGS. (4), (5) and (6).

Figure 2:
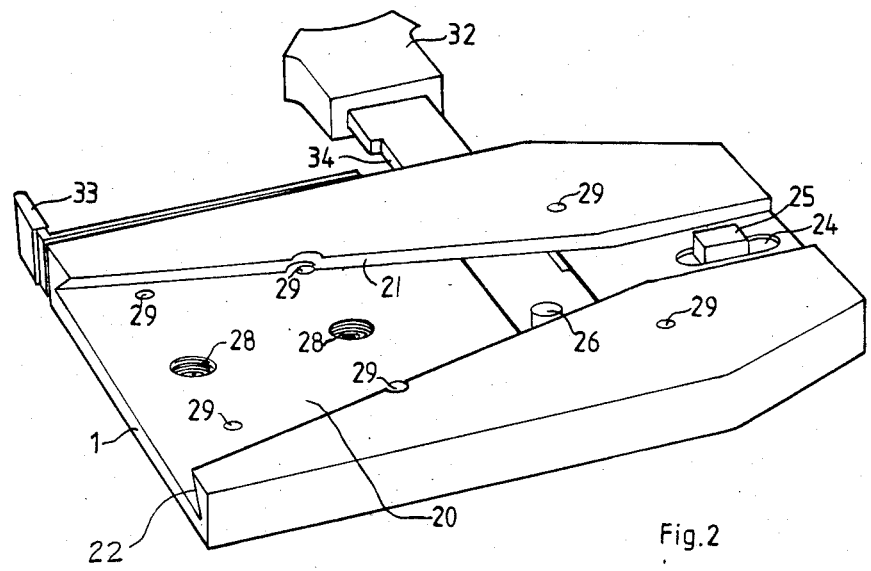
FIG. 2 shows a top view of the wedge adaptor
Figure 3:
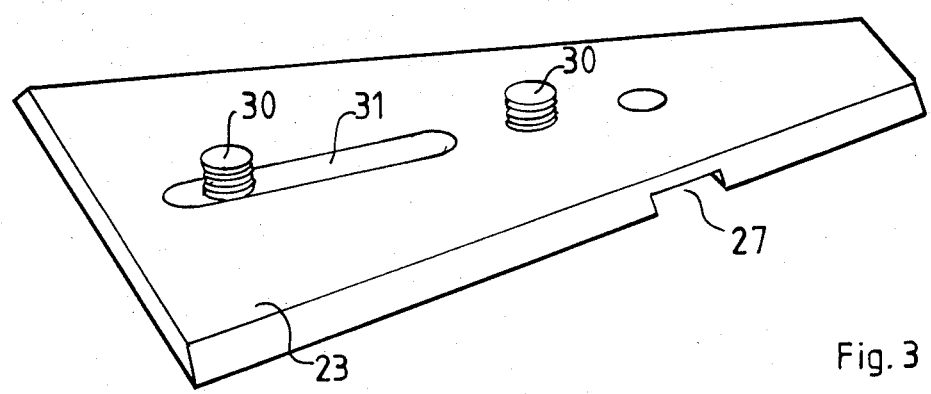
FIG. 3 shows an underside view of the wedge.
Figures 4, 5, 6:
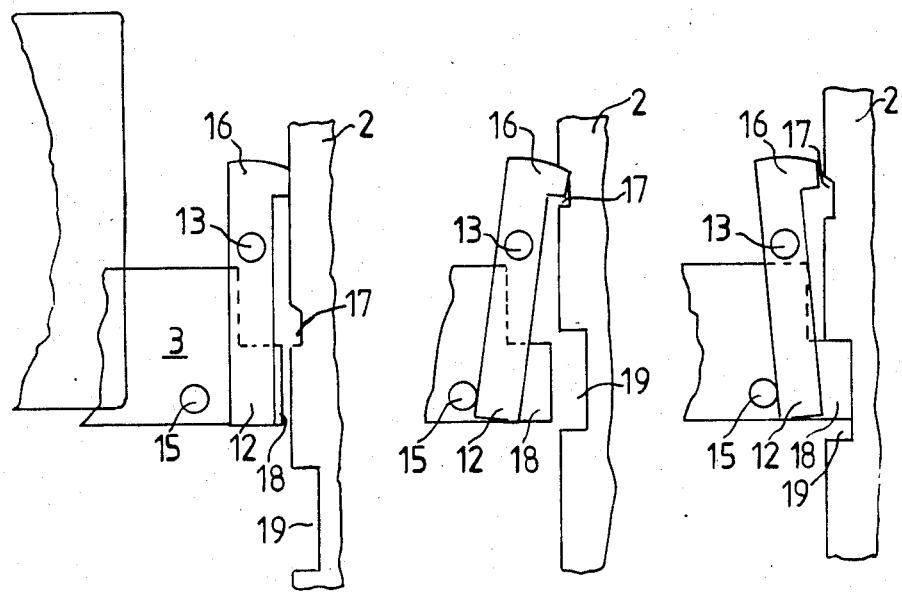
FIGS. 4, 5 and 6 show the action of the pawl, actuator and locking bar.

Referring now to FIG. 2 which shows a top view of the wedge adaptor in the lock state a wedge shaped section (20) has sides (21) and (22) angled at approximately 30° to the base plate (1) for reception of a wedge plate (23) shown on FIG. (3). An elongated slot (24) in the base plate (1) houses an abutment (25) on the top face of actuator (3) and moves actuator (3) thereby increasing the tension in spring (10) on insertion of wedge plate (23) shown on FIG. 3. A stud (26) preferably rivetted or screwed to locking bar (2) engages in a mating cut-out (27) to retain the wedge plate (23) in position on the wedge adaptor.

Tapped holes (28) and holes (29) provide a range of fixings for locating and securing the base plate (1) to a mounting head and screws (30) in conjunction with elongated slot (31) on the wedge plate (23) provide adequate fixings for locating and securing the wedge plate (23) to a camera.

Referring to FIGS. 1 and 2 the locking bar (2) has a thumb knob (32) for actuation of the locking bar to the unlock positions and is forced outward to the lock position by spring (8). To avoid inadvertent operation during use a safety lock (33) slidable on the side of base plate (1) is pushed forward towards locking bar (2) to engage in a safety locking cut-out (34) in the locking bar (2). Although a fair degree of pressure is required to push the locking bar into its unlock positions electric cables in the vicinity possibly being pulled against the thumb knob (32) could inadvertently release the mounted load, which could possibly be a camera.

In operation, insertion of the wedge plate into the female section on the base plate forces the abutment (25) on the actuator (3) forward against the spring (10) tension which pulls the actuator tongue (18) out of the second cut-out (19) and releases the locking bar (2) which is pulled along the transverse slot under the action of spring (8) to insert the stud (26) into the mating cut-out (27) thereby trapping the wedge (23) in the base plate (1). The safety lock (33) may now be slid forward to insert one end of the safety lock (33) into cut-out (34) in the locking bar (2).

Release of the safety lock (33) and the pushing of locking bar (2) into the base plate (1) withdraws the stud (26) from the wedge plate (23) but the load attached to wedge plate (23), acting on the base plate wedge shaped slot, permits the head (16) of the pawl (12), under spring tension from spring (10), to be forced into cut-out (17) where the radiused head abuts against the tangential edge of cut-out (17) and retains the locking bar (2) in this position, known as the frictional unlock position. The operator now has two hands free to lift the load i.e. camera and wedge attached thereto. As soon as the load resting on the base plate (1) is lessened the radiused head (16) of pawl (12) is released from the tangential side of cut-out (17) by the combined action of springs (8) and (10). Spring (8) forcing the locking bar (2) to the outward position and spring (10) forcing the head (16) of pawl (12) away from the locking bar (2) by the action of pin (15) on the tail of pawl (12). As the head of pawl (12) is freed from the tangential side of cut-out (17) the tongue (18) is being inserted into cut-out (19) of the locking bar (2). The width of cut-out (19) and the length of tongue (18) are such that the tongue (18) enters the cut-out (19) before the radiused head is completely free, thus ensuring that the full unlock positions is not bypassed.

I claim as my invention:

1. A wedge and wedge adaptor engagement system comprising:
    a wedge having a recess;
    a wedge adaptor in which said wedge is removably received, said wedge adaptor including
    (a) a base plate
    (b) a spring loaded locking means for locking said wedge to said base plate, said locking means being reciprocally movable between (i) a wedge unlocked position and (ii) a spring-biased wedge locked position where said recess is engaged by said locking means to prevent removal of said wedge from said wedge adaptor;
    (c) a spring loaded actuator means for frictionally holding said locking means in the unlocked position when said wedge is in said wedge adaptor and for positively holding said locking means in the unlocked position when said wedge is removed from said wedge adaptor, said actuator means including
        (i) an actuator pin,
        (ii) a pawl,
        (iii) mounting means for mounting said pawl to said base plate for movement into and out of frictional engagement with said locking means when said locking means is in the frictionally held unlocked position,
        (iv) a first moving means for moving said pawl mounted on said mounting means into frictional engagement with said locking means when said wedge is in the said wedge adaptor, and
        (v) a second moving means for moving said actuator pin into said pawl to move said pawl out of frictional engagement with said locking means and for moving said actuator means into positive full engagement with said locking means as said wedge is removed from said wedge adaptor; and
    (d) a wedge engagement means on said actuator means for causing said locking means to be released from the unlocked position to the locked position as said wedge is received in said wedge adaptor.

2. A wedge and wedge adaptor engagement system as claimed in claim 1 wherein said spring loaded actuator means engages in a cut-out in said spring loaded locking means in said positively held unlock position.

3. A wedge and wedge adaptor engagement system as claimed in claim 1 wherein said actuator means includes a spring which forces an arcuate head of said pawl into frictional engagement with a cut-out in said locking means.

4. A wedge and wedge adaptor engagement system as claimed in claim 3 wherein said cut-out in said locking means has at least one face tangential to the arcuate head of said pawl.

5. A wedge and wedge adaptor engagement system as claimed in claim 1 wherein said wedge adaptor includes a safety locking means to prevent inadvertent movement of said spring loaded locking means from said locked position to said frictionally held unlock or said positively held unlock position.

* * * * *